(12) United States Patent
Fouinat et al.

(10) Patent No.: US 12,208,718 B2
(45) Date of Patent: Jan. 28, 2025

(54) VEHICLE SEAT BACKREST AND ASSOCIATED MANUFACTURING METHOD

(71) Applicant: Faurecia Sièges d'Automobile, Nanterre (FR)

(72) Inventors: Didier Fouinat, Saint-Cheron (FR); Julie Thomas, Aynans (FR); Christophe Remy, Fougerolles (FR); Fabrice Etienne, Bavilliers (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 356 days.

(21) Appl. No.: 17/877,733

(22) Filed: Jul. 29, 2022

(65) Prior Publication Data

US 2023/0056871 A1 Feb. 23, 2023

(30) Foreign Application Priority Data

Jul. 30, 2021 (FR) ...................................... 21 08336

(51) Int. Cl.
*B60R 7/00* (2006.01)
*B32B 3/08* (2006.01)
(Continued)

(52) U.S. Cl.
CPC ............ *B60N 2/7017* (2013.01); *B32B 3/085* (2013.01); *B32B 3/266* (2013.01); *B32B 5/18* (2013.01); *B32B 5/32* (2013.01); *B32B 7/08* (2013.01); *B32B 27/065* (2013.01); *B32B 27/08* (2013.01); *B32B 27/40* (2013.01); *B60R 7/043* (2013.01); *A47C 31/023* (2013.01); *B32B 2255/10* (2013.01); *B32B 2605/00* (2013.01);

(Continued)

(58) Field of Classification Search
CPC .... B60R 7/005; B60N 2/5825; B60N 2/6036; F16B 5/06; F16B 5/126; F16B 5/128; G09F 3/16; G09F 2003/0282; A47C 31/023; B68G 7/08
See application file for complete search history.

(56) References Cited

U.S. PATENT DOCUMENTS 5,302,001 A * 4/1994 van Dis .................... B68G 7/08
                                                              5/409
10,766,393 B1   9/2020 Brown et al.
(Continued)

FOREIGN PATENT DOCUMENTS

DE          3929539 C1     10/1990
FR          3048742 A1     9/2017

OTHER PUBLICATIONS

French Search Report corresponding to French Application No. FR 2108336, dated Mar. 21, 2022, 2 pages.

*Primary Examiner* — Syed A Islam
(74) *Attorney, Agent, or Firm* — Reising Ethington P.C.

(57) ABSTRACT

A vehicle seat backrest having a body, a cover layer designed to be placed at the back of the body and covering at least a portion of the body, a storage apparatus defining a storage volume over a portion of the cover layer, and a fixation device for attaching the storage apparatus onto the cover layer. The fixation device includes at least one fixation support and at least one pin. The cover layer is overmolded onto the at least one fixation support. The at least one pin mates with the at least one fixation support and the storage apparatus so as to attach the storage apparatus to the cover layer.

13 Claims, 6 Drawing Sheets

(51) Int. Cl.
*B32B 3/26* (2006.01)
*B32B 5/18* (2006.01)
*B32B 5/32* (2006.01)
*B32B 7/08* (2019.01)
*B32B 27/06* (2006.01)
*B32B 27/08* (2006.01)
*B32B 27/40* (2006.01)
*B60N 2/70* (2006.01)
*B60R 7/04* (2006.01)
*A47C 31/02* (2006.01)
*B60N 2/58* (2006.01)
*B63G 7/08* (2006.01)
*F16B 5/06* (2006.01)
*F16B 5/12* (2006.01)
*G09F 3/02* (2006.01)

(52) U.S. Cl.
CPC ............... *B60N 2/5825* (2013.01); *B60R 7/00* (2013.01); *B60R 7/005* (2013.01); *B63G 7/08* (2013.01); *F16B 5/06* (2013.01); *F16B 5/126* (2013.01); *F16B 5/128* (2013.01); *G09F 2003/0282* (2013.01)

(56) References Cited

U.S. PATENT DOCUMENTS

2016/0375834 A1* 12/2016 Lemarchand ........... B60R 7/081
297/188.01
2019/0291654 A1    9/2019 Takeda \* cited by examiner

VEHICLE SEAT BACKREST AND ASSOCIATED MANUFACTURING METHOD

TECHNICAL FIELD

The invention relates to a backrest of a vehicle seat comprising a body, a cover layer designed to be placed at the back of the body and covering at least part of the body, and a storage apparatus attached to the cover layer and defining a storage volume over a portion of the cover layer.

BACKGROUND

The storage apparatus is, e.g. a purse pocket attached to a rear surface of the seat backrest so as to be accessible to a passenger seating behind the seat comprising said seat backrest.

It is known from the state of the art how to attach the storage apparatus to the cover layer by piercing holes in the cover layer and by inserting into said holes, means for attaching the storage apparatus.

However, piercing holes in the cover layer damages the integrity of the cover layer. Zones of weakness are thus generated on the cover layer. The latter thus deteriorates more easily, particularly in the vicinity of the holes.

Furthermore, the piercing may damage the cover layer and lead to scrapping of same.

Finally, the piercing of holes in the cover layer has to be performed depending on the size and positioning of the attachment means provided on the storage apparatus. The piercing is therefore an operation which requires great precision, hence making the production of the seat backrest more complex.

SUMMARY

One of the goals of the invention is to overcome these disadvantages by proposing a seat backrest wherein the storage apparatus is firmly attached in a simple manner which also preserves the integrity of the cover layer.

To this end, the invention relates to a backrest of a vehicle seat comprising a body, a cover layer designed to be placed at the back of the body and covering at least part of the body, a storage apparatus defining a storage volume over a portion of the cover layer and a fixation device for attaching the storage apparatus onto the cover layer, the fixation device comprising at least one fixation support and at least one pin, the cover layer being overmolded onto the at least one fixation support, the at least one pin cooperating with the at least one fixation support and the storage apparatus so as to attach the storage apparatus to the cover layer.

Due to the overmolding of the cover layer, holes are formed where-into the fixation supports are to be inserted, and there is no need to perforate a cover layer which was manufactured upstream for forming said holes. In this way, the risk of damaging the cover layer is prevented.

Furthermore, the making of the seat backrest is simplified since a finished cover layer is obtained without the need for a subsequent piercing operation.

Also, the positioning of the fixation supports is precise and can be easily adapted to the positioning of the attachment means of the storage apparatus.

Furthermore, the fixation support improves the rigidity of the attachment onto the cover layer. The attachment is provided by the cooperation between the pin and the fixation support; the cover layer is not directly stressed, which reduces the wear of said layer.

According to various embodiments of the invention, the following optional features may be utilized, whether taken in isolation or according to any technically feasible combination:

- the cover layer comprises polyurethane and/or plastic;
- the cover layer has at least one through hole, the at least one through hole having an edge, the at least one fixation support being a ring which extends into the at least one through hole about an axis, said ring comprising an inner circumferential face delimiting an attachment hole wherein the at least one pin extends, and an outer circumferential face radially opposite the inner circumferential face and extending against the edge of the corresponding through hole;
- the cover layer comprises a structure layer and a finish layer, the structure layer comprising an inner face oriented toward the body and an outer face opposite the inner face, the finish layer having an inner face extending over at least part of the outer face of the structure layer and an outer face opposite the inner face of the finish layer, the attachment hole extending from the inner face of the structure layer to the outer face of the finish layer;
- the finish layer comprises a paint layer and a non-cellular water-free polyurethane skin, the paint layer being formed by applying paint against a shaping surface of a shaping tool, the skin being applied against the paint layer in the shaping tool, the structure layer being made of foam and being formed by applying the foam against the skin in the shaping tool;
- the storage apparatus comprises a sheet and a frame around the sheet, the sheet being attached to the frame, the at least one pin cooperating with the frame, the storage volume extending between the cover layer and said sheet;
- the ring further comprises an inner transverse face oriented toward the body and an outer transverse face opposite said inner transverse face, the inner transverse face and the outer transverse face connecting the inner and outer circumferential faces, each pin comprising a base and two feet extending from the base parallel to the axis, the two feet resting against the inner circumferential face of the ring, the two feet delimiting therebetween a receiving space for receiving the frame;
- each foot of the at least one pin comprises a retaining protrusion extending into the receiving space, the frame being retained in the receiving space between the base of the pin and the retaining protrusions;
- the base of the at least one pin extends opposite the outer transverse face of the ring, each foot comprising an end extending facing the inner transverse face of the ring, each foot comprising at the end thereof, a stop extending radially with respect to the axis away from the axis, each stop resting against the inner transverse face of the ring; and
- the fixation device further comprises a cover covering the at least one pin, the cover comprising a main wall extending in a plane substantially perpendicular to the axis, and two side walls extending from the main wall toward the fixation support to a bearing end, the bearing end resting against the sheet so that the sheet is clamped between the bearing end and the outer transverse face of the ring, each side wall comprising a protrusion extending radially toward the axis, the base of the at least one pin comprising a bearing surface facing the outer transverse face of the ring, the bearing surface resting against each protrusion of the side walls so that the at least one pin is held in position along the axis.

The invention further relates to a vehicle seat comprising a seat cushion, a seat backrest as described above, and a seat headrest.

The invention further relates to a method for manufacturing a vehicle seat backrest comprising the steps of:

providing a body, a storage apparatus and a fixation device for attaching the storage apparatus onto a cover layer of the seat, the fixation device comprising at least one fixation support and at least one pin;

overmolding the cover layer on the at least one fixation support;

placing the cover layer at the back of the body, the cover layer covering at least part of the body; and arranging the at least one pin in such a way that the at least one pin cooperates with the at least one fixation support and the storage apparatus so as to attach the storage apparatus to the cover layer.

According to another optional feature of the method, the at least one fixation support is a ring, the overmolding of the cover layer on the at least one fixation support comprising the steps of:

providing of a shaping tool which comprises a first shaping surface having the shape of an outer surface of the cover layer and an imprint of an attachment hole wherein the at least one pin is designed to extend;

arranging the ring around the imprint and against the first shaping surface;

forming a finish layer on the first shaping surface; and applying a structure layer against an inner face of the finish layer.

BRIEF DESCRIPTION OF THE DRAWINGS

Other aspects and advantages of the invention will appear upon reading the following description, given only as an example, and making reference to the enclosed drawings, wherein.

DETAILED DESCRIPTION

Figure 1:
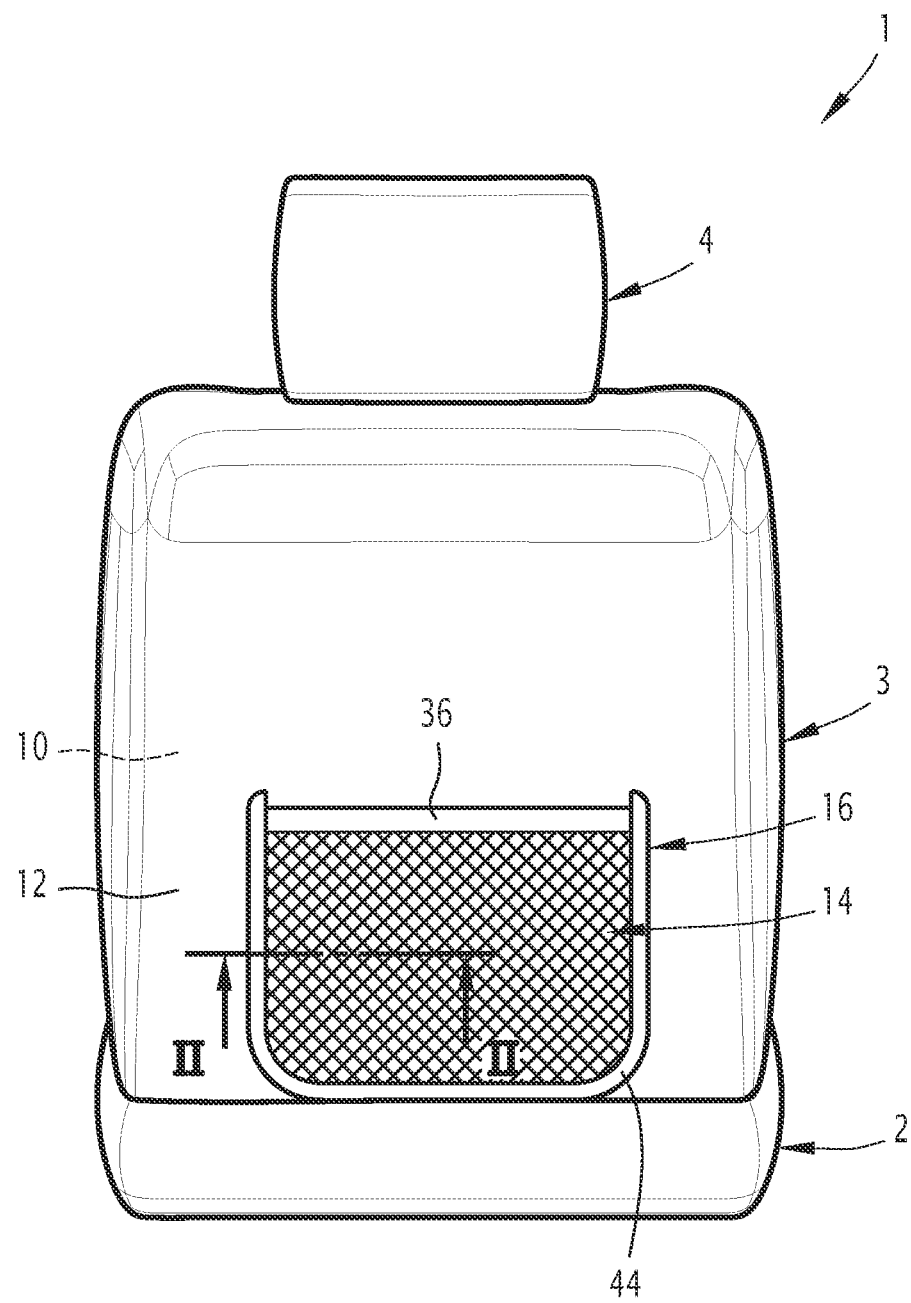
FIG. 1 is a back view schematic representation of a vehicle seat backrest according to an embodiment of the invention.

With reference to FIG. 1, a vehicle seat 1 is described. The seat 1 is, e.g. a seat of a land vehicle, sea vehicle or air vehicle. The seat 1 is, e.g. a motor vehicle seat.

The seat 1 is designed to receive a user of the seat 1.

Hereinafter, the terms "front" and "rear" are defined for the seat user sitting on the seat 1. The front corresponds to the direction in which the user is turned when seated in the seat 1. The rear corresponds to the direction opposite to the direction in which the user is turned when seated in the seat 1.

The seat 1 comprises a seat cushion 2, a seat backrest 3, and a seat headrest 4.

The cushion 2 and the headrest 4 of the seat 1 are e.g. conventional and will not be described in detail here.

Figure 2:
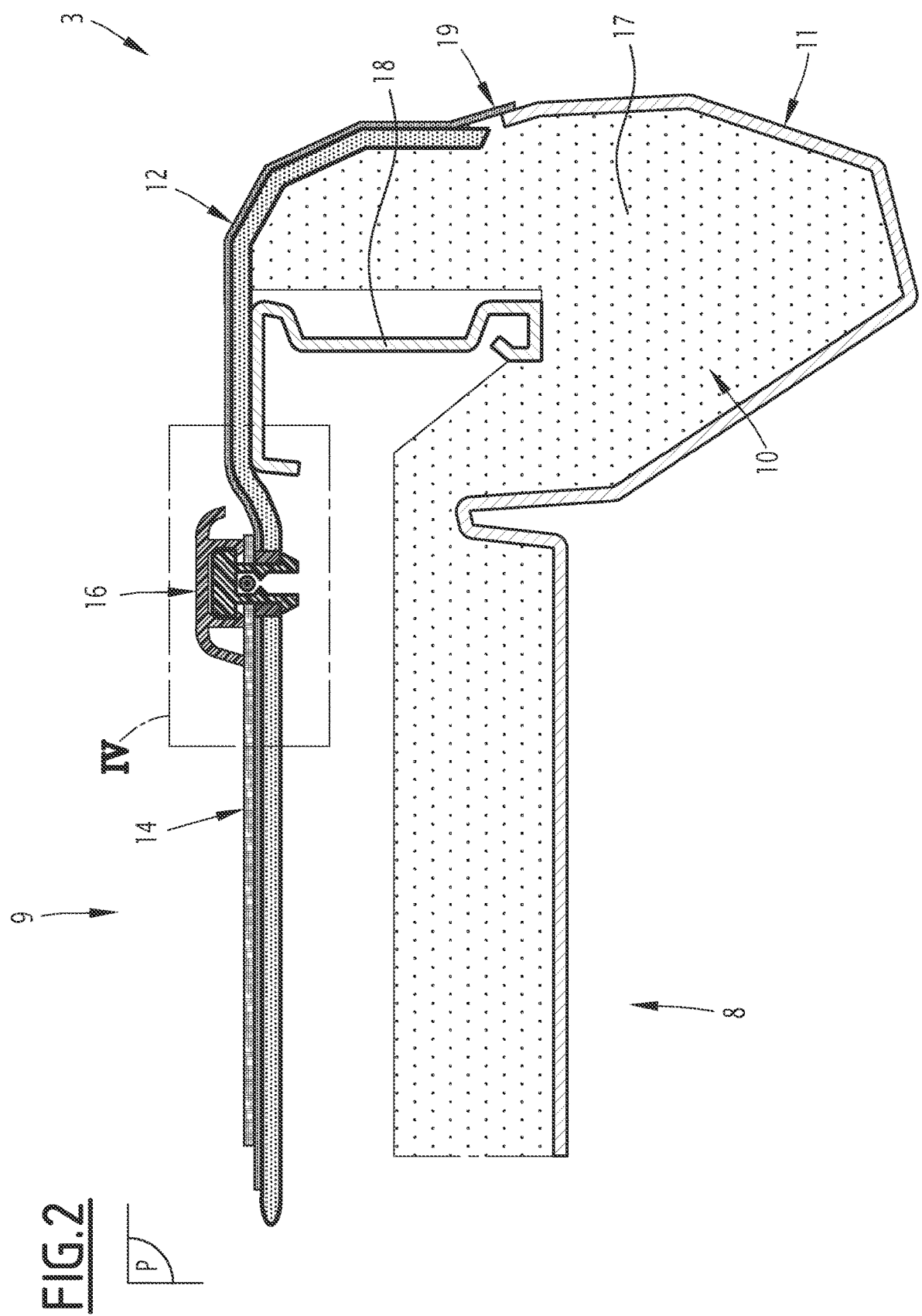
FIG. 2 is a partial cross-sectional view schematic representation of the seat backrest of FIG. 1 according to the sectional plane II-II of FIG. 1, showing a system for attaching the storage apparatus onto the cover layer.
Figure 3:
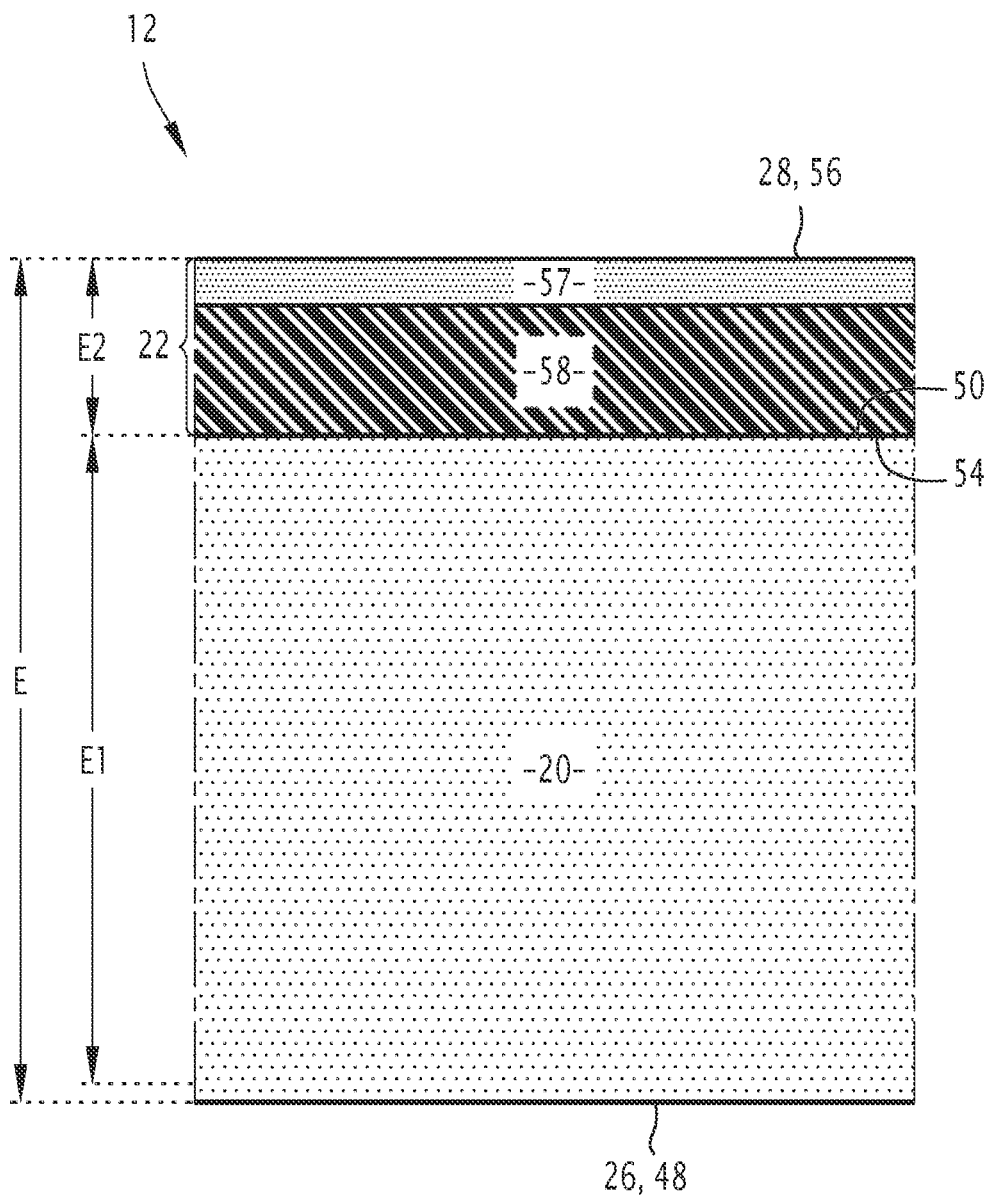
FIG. 3 is a cross-sectional representation of the cover layer of the backrest of FIG. 2.

With reference to FIGS. 2 and 3, the backrest 3 of the seat 1 comprises a body 10, a cover layer 12, a storage apparatus 14 and a fixation device 16 for attaching the storage apparatus 14 to the cover layer 12. The body 10 further comprises e.g. a covering 11 visible in FIG. 2.

The body 10 of the backrest 3 forms a support for the user of the seat 1. The body 10 gives the backrest 3 the shape thereof and comprises a front face 8 which is shaped for receiving the user of the seat 1, and a rear face 9 opposite the front face 8. In particular, when the user uses the seat 1, the user rests against the body 10, in particular against the front face 8 of the body 10. As illustrated in FIG. 2, the body 10 comprises, e.g. a padding 17 and an inner framework 18 on which the padding 17 is mounted.

The padding 17 is, e.g. made of foam, preferentially polyurethane foam. Advantageously, when the user uses the seat 1, the user rests on the padding 17.

The inner framework 18 is, e.g. attached to a floor of the vehicle. Same thus connects the padding 17 to the floor of the vehicle.

The covering 11 is, e.g. made of leather, fabric or synthetic material. As shown in the example of FIG. 2, the covering 11 covers at least part of the front face 8 of the body 10. The covering 11 gives its appearance to the front of the backrest 3. The covering 11 further contributes e.g. to the protection of the body 10.

The cover layer 12 is designed to be placed at the back of the body 10 and covers at least part of the body 10. In particular, as illustrated in FIG. 2, the cover layer 12 is placed at the back of the body 10 and covers at least part of the rear face 9 of the body 10. The cover layer 12 thus gives the back of the backrest 3, the appearance thereof. The cover layer 12 further contributes e.g. to the protection of the body 10.

As illustrated in FIG. 2, the cover layer 12 is, e.g. held close to the body 10 by means of at least one mechanical connection 19 with the covering 11. Thus, the covering 11 and the cover layer 12 are part of a set enveloping the body 10. The at least one mechanical connection 19 is, e.g. a zip or a stitched profile connection.

According to a variant, the cover layer 12 is attached to the inner framework 18 of the body 10 by at least one clip (not shown).

The cover layer 12 e.g. comprises polyurethane and/or plastic.

Figure 4:
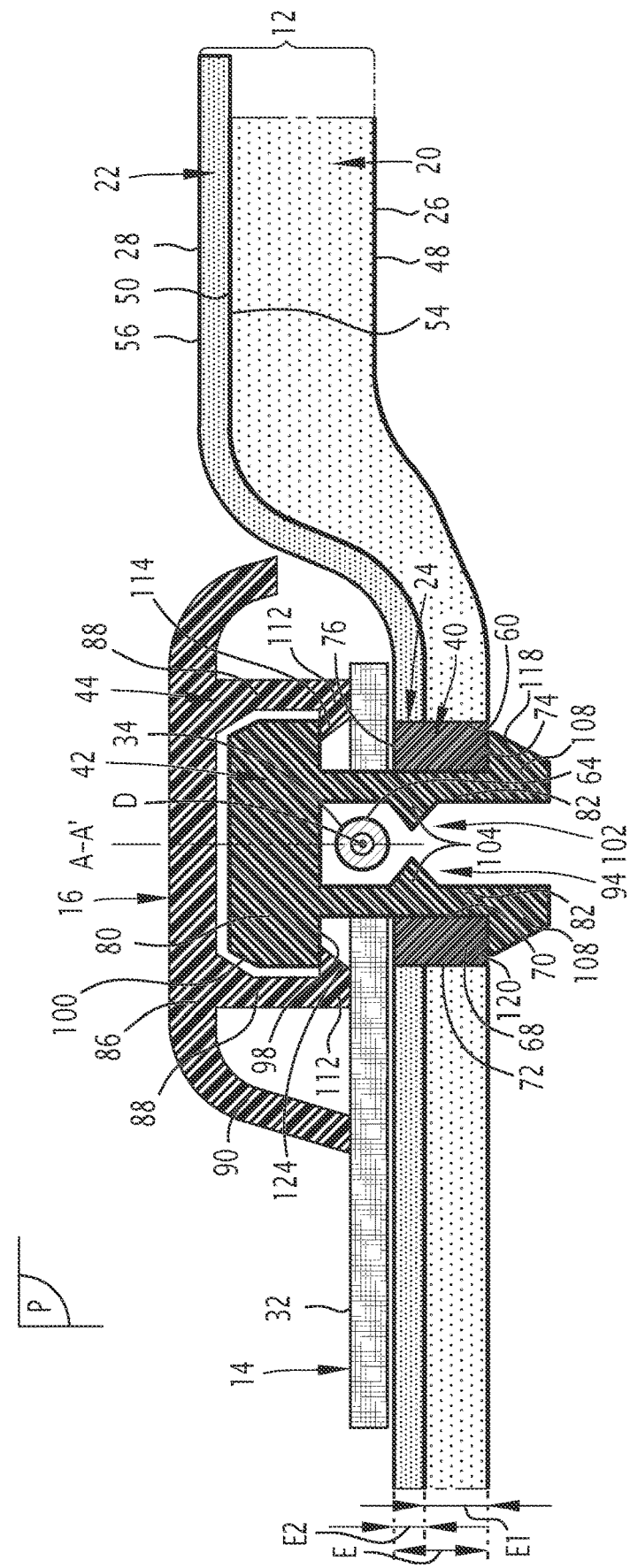
FIG. 4 is an enlarged representation of FIG. 2 corresponding to box IV shown in FIG. 2.

As illustrated in FIGS. 3 and 4, the cover layer 12 comprises e.g. a structure layer 20 and a finish layer 22 and has at least one through hole 24 (visible in FIG. 4). The cover layer 12 comprises e.g. a plurality of through holes 24. Hereinafter, for conciseness, only one through hole 24 is described.

The cover layer 12 comprises an inner surface 26 oriented toward the body 10 and an outer surface 28 opposite the inner surface 26.

The cover layer 12 is thin. The term "thin" means that the cover layer 12 extends in three dimensions, one of said three dimensions (corresponding to a thickness E of the cover layer, i.e. a distance between the inner surface 26 and the outer surface 28 of the cover layer 12) being much smaller than the other two dimensions (corresponding to a width and a length of the cover layer 12). The thickness E of the cover layer 12 is, e.g. between 0.8 mm and 50 mm, preferentially between 0.8 and 15 mm. The length/thickness and width/thickness ratios are, e.g. between 15 and 1,250. Furthermore, an average dimension of the body 10 is e.g. comprised between 200 mm and 1,000 mm. Thus, the cover layer 12 is also considered thin compared to the body 10 it covers.

As illustrated in FIG. 4, the cover layer 12 is, moreover, molded onto at least one fixation support 40 of the fixation device 16. The cover layer 12 is e.g. overmolded onto a plurality of fixation supports 40. Thus, the cover layer surrounds and holds the fixation support(s) 40. The fixation support(s) 40 is/are then rigidly attached by overmolding to the cover layer 12.

As illustrated in FIG. 4, the through hole 24 extends from the inner surface 26 to the outer surface 28 of the cover layer 12.

The through hole 24 has an edge 60 delimiting the through hole 24.

As will be described below, the through hole 24 is configured for receiving at least part of the fixation device 16.

With reference to FIGS. 3 and 4, the structure layer 20 comprises an inner face 48 and an outer face 50. The inner face 48 of the structure layer 20 is oriented toward the body 10 and the outer face 50 of the structure layer 20 is opposite the inner face 48. The inner face 48 of the structure layer 20 e.g. takes the shape of the body 10 and extends over the body 10.

The structure layer 20 has a thickness E1 corresponding to the distance between the inner face 48 thereof and outer face 50 thereof. The thickness E1 of the structure layer 20 is e.g. comprised between 0.5 mm and 50 mm, preferentially between 0.5 mm and 15 mm.

The structure layer 20 is, e.g. made of foam, e.g. a polyurethane (PU) foam, in particular a foam having a formulation containing water and optionally a foaming catalyst at the time of the application thereof to the finish layer 22.

The structure layer 20 has a hardness comprised between 10 and 100 Shore A measured according to the ISO 868 standard.

The structure layer 20 has a rigidity comprised between 5 N and 50 N for a deflection of 30 mm applied by a semi-cylindrical punch to the center of a 240 mm×40 mm×9 mm test piece resting at the two ends thereof on a support whose bearing surfaces are 150 mm apart.

Due to such values of rigidity and hardness, the structure layer 20 is sufficiently rigid and hard to support the finish layer 22 and to cooperate with the fixation device 16.

With reference to FIGS. 3 and 4, the finish layer 22 comprises an inner face 54 and an outer face 56. The inner face 54 of the finish layer 22 extends over at least part of the outer face 50 of the structure layer 20. The outer face 56 of the finish layer 22 is opposite the inner face 54 of the finish layer 22.

The finish layer 22 has a thickness E2 corresponding to the distance between the inner face 54 thereof and the outer face 56 thereof. The thickness E2 of the finish layer 22 is e.g. between 0.5 mm and 3 mm. The thickness E2 is measured under dry conditions.

As illustrated in FIG. 3, the finish layer 22 comprises e.g. a layer of paint 57 and a skin 58.

As will be described in more detail below, the paint layer 57 is formed by applying paint against a shaping surface of a shaping tool. In particular, the paint is sprayed onto the shaping surface. The paint is e.g. a single-component paint or a two-component paint comprising a "resin" and a "hardener", mixed just before application.

The skin 58 is made e.g. of non-cellular water-free polyurethane. As will be described in more detail below, the skin 58 is applied against the paint layer 57 in the shaping tool. In particular, the polyurethane designed to form the skin 58 is sprayed in liquid state onto the paint layer 57. The skin 58 is e.g. apt to stick onto the paint layer 57.

The skin 58 is apt to stick to the structure layer 20 when same is applied to the structure layer 20. In particular, as will be described in more detail below, the structure layer 20 is formed by applying the foam against the polyurethane skin 58 in the shaping tool.

As illustrated in FIG. 4, the storage apparatus 14 defines a storage volume over a portion of the cover layer 12. Same comprises e.g. a sheet 32 and a frame 34 around the sheet 32. The storage volume extends between the cover layer 12 and the sheet 32, in particular between the finish layer 22 and the sheet 32. The storage apparatus 14 is intended to receive, in the storage volume, one or a plurality of objects that a passenger of the vehicle wishes to store. Said object(s) are held in the storage volume between the sheet 32 and the cover layer 12.

Optionally, as illustrated in the example of FIG. 1, the storage apparatus 14 comprises, in an upper portion, an elastic strip 36 designed to bring the sheet 32 back toward the cover layer 12.

As shown in the example in FIG. 1, the sheet 32 is e.g. a net forming a pocket. The net is e.g. made of fabric or polymer. The sheet 32 is attached to the frame 34. The sheet 32 has a multitude of meshes which are each attached to the frame 34, e.g. by a knot around the frame 34. The sheet 32 is e.g. elastically deformable. In particular, it is designed to be deformed at least partially during the insertion of an object into the storage volume. The sheet 32 is brought back to the initial shape thereof, e.g. by the action of the elastic strip 36.

In a variant, the sheet 32 is a continuous layer of leather, of either woven or non-woven fabrics, or of polymer.

With reference to FIG. 4, the frame 34 forms a rigid support for the sheet 32. The frame 34 comprises a cylindrical rod 64 e.g. curved. The cylindrical rod 64 e.g. extends along a U-shaped trajectory, the sheet 32 extending between the two branches of the U. With reference to FIGS. 1 and 4, optionally, the cylindrical rod 64 extends locally under a cover 44 of the fixation device 16 along an extension direction D. Thus, the frame 34 is covered by the cover 44 so that the frame 34 is not visible from outside the backrest 3. The rod 64 is e.g. a steel rod.

As will be described below, the frame 34 is retained in at least one receiving space 102 defined by at least one pin 42 of the fixation device 16. In particular, the rod 64 of the frame 34 is retained in the receiving space 102.

The fixation device 16 comprises at least one fixation support 40, at least one pin 42 and optionally the cover 44. The fixation device 16 is configured for attaching the storage apparatus 14 onto the cover layer 12. The fixation device 16 e.g. comprises a plurality of fixation supports 40 and a plurality of pins 42. The number of pins 42 is equal to the number of fixation supports 40 which is equal to the number of through holes 24. Hereinafter, for conciseness, only one fixation support 40 and only one pin 42 are described.

The fixation support 40 is, e.g. a ring 68 extending into the through hole 24 about an axis A-A'. The ring 68 comprises an inner circumferential face 70, an outer circumferential face 72, an inner transverse face 74, and an outer transverse face 76. The ring 68 delimits an attachment hole 94 whereinto the pin 42 extends.

The inner circumferential face 70 of the ring 68 delimits the attachment hole 94 whereinto the pin 42 extends. The attachment hole 94 extends from the inner face 48 of the structure layer 12 to the outer face 56 of the finish layer 22.

The outer circumferential face 72 of the ring 68 is radially opposite the inner circumferential face 70 and extends against the edge 60 of the through hole 24.

The inner transverse face 74 of the ring 68 is oriented toward the body 10. The inner transverse face 74 extends in the continuity of the inner surface 26 of the cover layer 12, i.e. in the continuity of the inner face 48 of the structure layer 20.

The outer transverse face 76 is opposite the inner transverse face 74. Same extends in the continuity of the outer surface 28 of the cover layer 12, i.e. in the continuity of the outer face 56 of the finish layer 22.

The inner transverse face 74 and the outer transverse face 76 of the ring 68, connect the inner 70 and outer 72 circumferential faces of the ring 68.

The pin 42 cooperates with the fixation support 40 and the storage apparatus 14 so as to attach the storage apparatus 14 to the cover layer 12. The pin 42 e.g. cooperates in particular with the frame 34 of the storage apparatus 14. The pin 42 comprises a base 80 and two feet 82 which extend from the base 80. The pin 42 is at least partially inserted into the fixation support 40.

The base 80 of the pin 42 extends opposite the outer transverse face 76 of the ring 68. As illustrated in FIG. 4, the base 80 e.g. also extends opposite the frame 34 and the sheet 32. The base 80 comprises a bearing surface 98 oriented toward the outer transverse face 76 of the ring 68. The bearing surface 98 rests against the protrusions 114 of the cover 44, as will be described below. According to a variant which is not shown, the bearing surface 98 rests against the sheet 32 so as to press the sheet 32 against the cover layer 12.

Optionally, the base 80 comprises a beveled surface 100 oriented opposite the bearing surface 98. The beveled surface 100 cooperates with the cover 44 so as to facilitate the application thereof around the pin 42.

With reference to FIG. 4, each foot 82 of the pin 42 extends from the base 80 parallel to the axis A-A' toward the ring 68.

In particular, the two feet 82 extend parallel to one another in a plane P comprising the axis A-A' and perpendicular to the extension direction D of the rod 64 of the frame 34.

Each foot 82 extends into the attachment hole 94 and rests against the inner circumferential face 70 of the ring 68. The two feet 82 delimit the space 102 therebetween for receiving the frame 34.

Each foot 82 comprises a retaining protrusion 104 which extends into the receiving space 102. The frame 34 is retained in the reception space 102 between the base 80 of the pin 42 and the retaining protrusions 104. The retaining protrusions 104 delimit therebetween a passage of which one dimension, corresponding to the distance between the retaining protrusions 104, is smaller than a diameter of the rod 64. The retaining protrusions 104 e.g. are configured for being deformed elastically when the frame 34 is inserted into the receiving space 102 between the base 80 of the pin 42 and the retaining protrusions 104 so as to allow the frame 34 to pass through toward the base 80 of the pin 42.

Each foot 82 comprises an end extending opposite the inner transverse face 74 of the ring 68. Thus, each foot 82 extends from the base 80 on one side of the cover layer 12, in particular from an outer side of the cover layer 12, to the end thereof on the other side of the cover layer 12, in particular on an inner side of the cover layer 12.

Each foot 82 comprises at the end thereof, a stop 108 for holding the pin 42 in position.

The stop 108 of each foot 82 extends radially with respect to the axis A-A' away from the axis A-A'. As shown in FIG. 4 e.g. each stop 108 comprises a beveled guiding surface 118 allowing the pin 42 to be guided when same is inserted into the attachment hole 94.

Each stop 108 of each foot 82 rests against the inner transverse face 74 of the ring 68. In particular, each stop 108 comprises a retaining surface 120 cooperating with the inner transverse face 74 of the ring 68 so as to prevent a displacement of the pin 42 away from the cover layer 12.

In particular, when the pin 42 is inserted into the attachment hole 94, the guiding surfaces 118 cooperate with the ring 68 so as to bring the feet 82 closer to each other and to allow the feet 82 to be inserted into the attachment hole 94. Following insertion, the feet 82 move away from each other and the retaining surfaces 120 then mate with the inner transverse face 74 of the ring 68.

With reference to FIGS. 1 and 4, the cover 44 covers each pin 42. The cover 44 comprises a main wall 86, two side walls 88 extending from the main wall 84 toward the fixation support 40 and a support arm 90 configured for pressing the sheet 32 against the cover layer 12. The cover 44 is applied about the pin 42 when the storage apparatus 14 is attached onto to the cover layer 12.

As will be described below, e.g. the cover 44 also cooperates with the pin 42 and the fixation support 40 so as to attach the storage apparatus 14 to the cover layer 12. Furthermore, the cover 44 improves the aesthetics of the backrest 3 in that it hides the fixation device 16.

With reference to FIGS. 1, 2, and 4, the main wall 86 of the cover 44 extends in a plane substantially perpendicular to the axis A-A'.

Each side wall 88 of the cover 44 extends from the main wall 86 toward the fixation support 40 as far as a bearing end 112.

As illustrated in FIG. 4, the bearing end 112 rests against the sheet 32 so that the sheet 32 is clamped between the bearing end 112 and the outer transverse face 76 of the ring 68.

Each lateral wall 88 comprises at the bearing end 112 thereof, a protrusion 114 for holding the pin 42 in position.

The protrusion 114 of each lateral wall 88 of the cover 44 extends radially toward the axis A-A' between the bearing surface 98 of the base 80 of the pin 42 and the sheet 32. As shown in FIG. 4, each protrusion 114 comprises e.g. a beveled guiding surface 124 for guiding the cover 44 during the insertion thereof around the pin 42.

Each protrusion 114 is pressed between the bearing surface 98 of the base 80 of the pin 42 and the sheet 32. Thus, the bearing surface 98 of the base 80 of the pin 42 rests against the protrusions 114 of each side wall 88 so that the pin 42 is held in position along the axis A-A'.

When the cover 44 is applied around the pin 42, the guiding surfaces 124 cooperate with the beveled surfaces 100 of the base 80 of the pin 42 so as to separate the side walls 88 of the cover 44 from each other. Following the application of the cover 44 about the pin 42, the lateral walls 88 move toward each other and the protrusions 114 are then pressed between the bearing surface 98 and the sheet 32.

The support arm 90 extends from a side wall 88 toward the sheet 32 for clamping the sheet 32 against the cover layer 12.

The support arm 90 comprises a first branch extending from said lateral wall 88 away from said lateral wall 88 and a second branch extending from the first branch toward the sheet 32.

Hereinafter, with reference to FIGS. 5 and 6, a method for making the backrest 3 is described.

The method initially comprises, providing the body 10, the storage apparatus 14, and the fixation device 16. The method involves manipulating a fixation device 16 comprising at least one fixation support 40 and at least one pin 42. However, hereinafter, for conciseness, only one fixation support 40 and only one pin 42 will be described.

The method comprises a step of overmolding the cover layer 12 onto the fixation support 40.

The overmolding of the cover layer 12 e.g. comprises the provision of a shaping tool 150 comprising a first shaping surface 152 which has the shape of the outer surface 28 of the cover layer 12 and an imprint 154 of the attachment hole 94. The shaping tool further comprises e.g. a second shaping surface 156 having the shape of the inner surface 26 of the cover layer 12.

The imprint 154 of the attachment hole 94 protrudes from the first surface 152 and has a shape matching the shape of the attachment hole 94.

The overmolding then comprises the arrangement of the ring 68 about the imprint 154 and against the first shaping surface 152.

Figure 5:
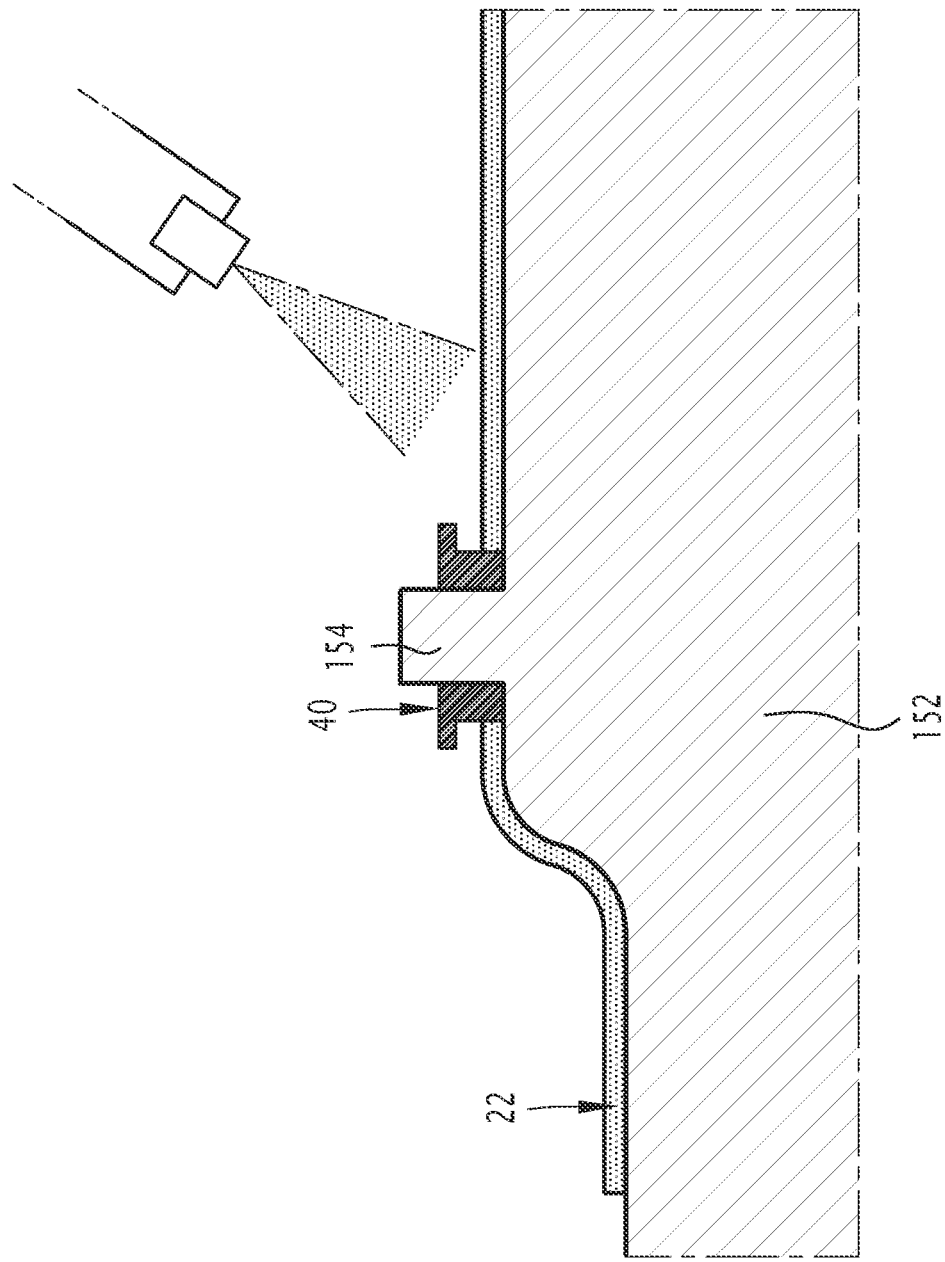
FIG. 5 is a schematic cross-sectional representation of a shaping tool for making the seat backrest, illustrating a step of forming a finish layer of the cover layer.
Figure 6:
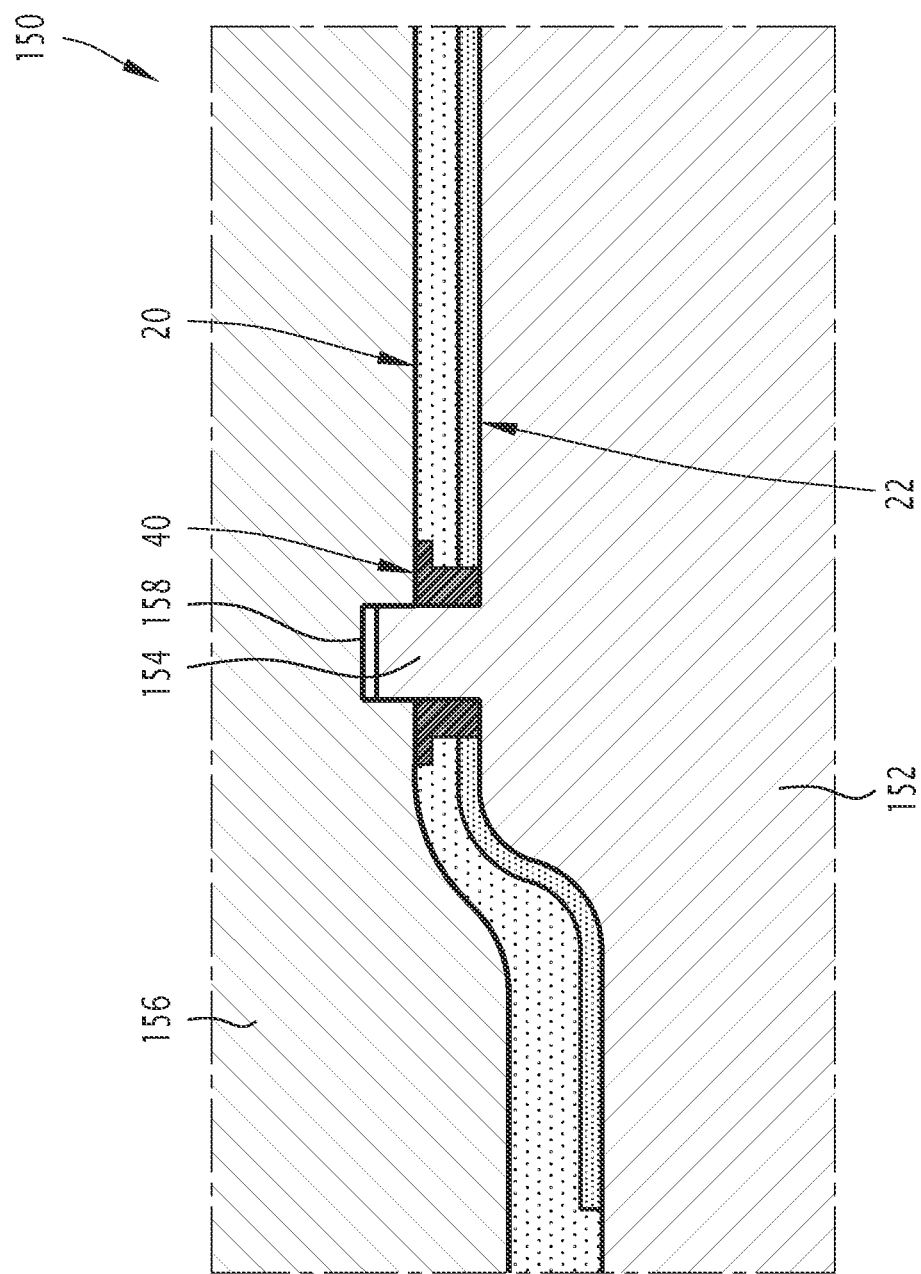
FIG. 6 is a schematic cross-sectional view of the shaping tool of FIG. 5, illustrating a step of applying the structure layer against an inner face of the finish layer.

As illustrated in FIG. 5, the overmolding further comprises e.g. the formation of the finish layer 22 onto the first shaping surface 152.

The finish layer 22 is formed by applying paint against the first shaping surface 152 of the shaping tool 150 so as to form the paint layer 57 and then by applying the skin 58 against the paint layer 57 in the shaping tool 150. Preferentially, the paint layer 57 or the skin 58, respectively, is applied by spraying the paint, or by spraying polyurethane in liquid state, respectively.

The first shaping surface 152 e.g. is heated so as to obtain a quick drying of the finish layer 22.

According to one embodiment, a mold release agent is first applied onto the first shaping surface 152 before the finish layer 22 is produced, and the paint layer 57 is applied onto the mold release agent which lines the first shaping surface 152. Such a mold release agent is e.g. applied by spraying onto the first shaping surface 152 and facilitates the removal from the shaping tool of the cover layer 12 produced, as will be subsequently described.

As illustrated in FIG. 5, the finish layer 22 then extends about the fixation support 40, i.e. the ring 68.

Finally, the overmolding also comprises the application of the structure layer 20 against the inner face 54 of the finish layer 22. Preferentially, the structure layer 20 is applied by applying foam, e.g. a PU foam, against the skin 58 in the shaping tool 150.

To this end, the second shaping surface 156 is brought closer to the first shaping surface 152 so as to form a shaping space therebetween for the structure layer 20. The shaping tool then has a system (not shown) for injecting the foam, e.g. a PU foam, into the shaping space of the structure layer 20. The second shaping surface 156 e.g. comprises a recess 158 wherein the imprint 154 of the first shaping surface 152 extends. The recess 158 has e.g. a shape which substantially matches the shape of the imprint 154. The injected foam then extends over the finish layer 22 about the fixation support 40 between the first shaping surface 152 and the second shaping surface 156. Thus, the foam is applied by injecting the foam into the shaping space, between the first shaping surface 152 and the second shaping surface 156. After injection, the foam takes the shape of the shaping space and matches the shapes of the first and second shaping surfaces 152, 156. Thus, the structure layer 20 has the shape of the inner surface 26 of the cover layer 12.

According to one embodiment, a mold release agent is also first applied to the second shaping surface 156 before the structure layer 20 is produced.

Thus, in summary, the formation of the finish layer 22 comprises the application of the paint against the first shaping surface 152 of the shaping tool 150, and the application of the skin 58 against the paint layer 57 in the shaping tool 150. The formation of the cover layer 12 comprises the formation of the finish layer 22 and the application of the structure layer 20 comprising the application of the foam against the skin 58 in the shaping tool 150.

After cooling and hardening of the structure layer 20 and the finish layer 22, the cover layer 12 and the fixation support 40 form a coherent assembly wherein the structure layer 20, the finish layer 22 and the fixation support 40 are attached to each other. The shaping tool 150 is then opened and the assembly comprising the cover layer 12 and the fixation support 40 is removed from the shaping tool 150, such operation being easier when a mold release agent has been applied to the first shaping surface 152 and/or to the second shaping surface 156.

The method then comprises a step of placing the cover layer 12 at the back of the body 10 so that the cover layer 12 covers at least part of the body 10. Advantageously, the covering 11 is placed at the front of the body 10 so that the covering 11 covers at least part of the body 10. The mechanical connection 19 e.g. is produced between the covering 11 and the cover layer 12 so that the covering 11 and the cover layer 12 are held close to the body 10.

In a variant, the cover layer 12 is attached to the inner framework 18 of the body 10 by at least one clip.

Finally, the method comprises a step of arranging the pin 42 so that the pin 42 cooperates with the fixation support 40 and the storage apparatus 14 so as to attach the storage apparatus 14 to the cover layer 12.

In a first stage, the frame 34 e.g. is introduced into the receiving space 102 between the base 80 of the pin 42 and the retaining protrusions 104 in order to be retained therein.

The pin 42 is then inserted into the attachment hole 94. The guiding surfaces 118 then cooperate with the ring 68 so as to bring the feet 82 closer to each other and to allow the feet 82 to be inserted into the attachment hole 94. After insertion, the feet 82 move away from each other and the retaining surfaces 120 then cooperate with the inner transverse face 74 of the ring 68 so as to prevent a displacement of the pin 42 away from the cover layer 12.

Optionally, the cover 44 is then applied about the pin 42. The guiding surfaces 124 then mate with the beveled surfaces 100 of the base 80 of the pin 42 so as to move the lateral walls 88 of the cover 44 away from one another. Following the application of the cover 44 about the pin 42, the lateral walls 88 move toward each other and the protrusions 114 are then pressed between the bearing surface 98 and the sheet 32.

Thus, the pin 42 is held in position along the axis A-A' and the sheet 32 is pressed against the cover layer 12 by the bearing ends 112.

In this way, the storage apparatus 14 and the cover layer 12 are attached together.

Furthermore, a firm attachment of the storage apparatus 14 onto the cover layer 12 is made possible while preserving the integrity of the cover layer 12. Indeed, e.g. there is no need to perforate the cover layer 12 in order to adapt thereof, means for attaching the storage apparatus 14.

Since the attachment is provided by mating the pin 42 with the fixation support 44, there is no need to directly use the cover layer 12 for supporting the storage apparatus 14. Hence, in this way, the wear of the cover layer 12 is reduced.

The invention claimed is:

1. A backrest of a vehicle seat comprising a body, a cover layer designed to be placed at the back of the body and covering at least part of the body, a storage apparatus defining a storage volume over a portion of the cover layer, and a fixation device for attaching the storage apparatus onto the cover layer, the fixation device comprising at least one fixation support and at least one pin, the cover layer being overmolded onto the at least one fixation support, the at least one pin cooperating with the at least one fixation support and the storage apparatus so as to attach the storage apparatus to the cover layer.

2. The seat backrest according to claim 1, wherein the cover layer comprises polyurethane and/or plastic.

3. The seat backrest according to claim 1, wherein the cover layer has at least one through hole, the at least one through hole having an edge, the at least one fixation support being a ring which extends into the at least one through hole about an axis, said ring comprising an inner circumferential face delimiting an attachment hole wherein the at least one pin extends, and an outer circumferential face radially opposite the inner circumferential face and extending against the edge of the corresponding through hole.

4. The seat backrest according to claim 3, wherein the cover layer comprises a structure layer and a finish layer, the structure layer comprising an inner face oriented toward the body and an outer face opposite the inner face, the finish layer having an inner face extending over at least part of the outer face of the structure layer and an outer face opposite the inner face of the finish layer, the attachment hole extending from the inner face of the structure layer to the outer face of the finish layer.

5. The seat backrest according to claim 4, wherein the finish layer comprises a paint layer and a non-cellular water-free polyurethane skin, the paint layer being formed by applying paint to a shaping surface of a shaping tool, the skin being applied to the paint layer in the shaping tool, the structure layer being made of foam and being formed by applying the foam against the skin in the shaping tool.

6. The seat backrest according to claim 1, wherein the storage apparatus comprises a sheet and a frame around the sheet, the sheet being attached to the frame, the at least one pin cooperating with the frame, the storage volume extending between the cover layer and said sheet.

7. The seat backrest according to claim 3, wherein the storage apparatus comprises a sheet and a frame around the sheet, the sheet being attached to the frame, the at least one pin cooperating with the frame, the storage volume extending between the cover layer and said sheet, wherein the ring further comprises an inner transverse face oriented toward the body and an outer transverse face opposite said inner transverse face, the inner transverse face and the outer transverse face connecting the inner and outer circumferential faces, each pin comprising a base and two feet extending from the base parallel to the axis, the two feet resting against the inner circumferential face of the ring, the two feet delimiting therebetween, a receiving space for receiving the frame.

8. The seat backrest according to claim 7, wherein each foot of the at least one pin comprises a retaining protrusion extending into the receiving space, the frame being retained in the receiving space between the base of the pin and the retaining protrusions.

9. The seat backrest according to claim 7, wherein the base of the at least one pin extends opposite the outer transverse face of the ring, each foot comprising an end extending facing the inner transverse face of the ring, each foot comprising at the end thereof, a stop extending radially with respect to the axis away from the axis, each stop resting against the inner transverse face of the ring.

10. The seat backrest according to claim 9, wherein the fixation device further comprises a cover covering the at least one pin, the cover comprising a main wall extending in a plane substantially perpendicular to the axis, and two side walls extending from the main wall toward the fixation support to a bearing end, the bearing end resting against the sheet so that the sheet is clamped between the bearing end and the outer transverse face of the ring, each side wall comprising a protrusion extending radially toward the axis, the base of the at least one pin comprising a bearing surface facing the outer transverse face of the ring, the bearing surface resting against each protrusion of the side walls so that the at least one pin is held in position along the axis.

11. A vehicle seat comprising a seat cushion, the seat backrest according to claim 1, and a seat headrest.

12. A method for manufacturing a backrest of a vehicle seat comprising:
   providing a body, a storage apparatus, and a fixation device for attaching the storage apparatus onto a cover layer of the seat, the fixation device comprising at least one fixation support and at least one pin;
   overmolding of the cover layer on the at least one fixation support;
   placing the cover layer at the back of the body, the cover layer covering at least part of the body; and
   arranging the at least one pin in such a way that the at least one pin cooperates with the at least one fixation support and the storage apparatus so as to attach the storage apparatus to the cover layer.

13. The method according to claim 12, wherein the at least one fixation support is a ring, the overmolding of the cover layer onto the at least one fixation support comprising:
   providing a shaping tool comprising a first shaping surface having the shape of an outer surface of the cover layer and an imprint of an attachment hole wherein the at least one pin is designed to extend;
   arranging the ring around the imprint and against the first shaping surface;
   forming of a finish layer on the first shaping surface; and
   applying the structure layer against an inner face of the finish layer.

* * * * *